United States Patent [19]

Zanessi

[11] Patent Number: 4,638,378

[45] Date of Patent: Jan. 20, 1987

[54] FIDELITY CONTROL DURING OPERATION OF DUPLICATOR MACHINES

[76] Inventor: Arrigo Zanessi, Montevideo 215, 5500 Mendoza, Argentina

[21] Appl. No.: 743,778

[22] Filed: Jun. 12, 1985

[30] Foreign Application Priority Data

Jun. 12, 1984 [AR] Argentina ............................ 296890

[51] Int. Cl.⁴ ......................... G11B 5/02; G11B 5/09; G11B 5/86; G11B 27/36
[52] U.S. Cl. ........................................ 360/15; 360/53
[58] Field of Search ....................... 360/15, 16, 53, 25, 360/31

[56] References Cited

U.S. PATENT DOCUMENTS

| | | | |
|---|---|---|---|
| 2,774,056 | 12/1956 | Stafford et al. | 360/31 X |
| 2,903,509 | 9/1959 | Houghton | 360/25 X |
| 3,359,548 | 12/1967 | Yoshii et al. | 360/53 |
| 3,535,467 | 10/1970 | Thieme et al. | 360/15 X |
| 3,551,608 | 12/1970 | Balint | 360/15 |
| 3,805,284 | 4/1974 | Coon, Jr. et al. | 360/15 |

FOREIGN PATENT DOCUMENTS 2650891 5/1978 Fed. Rep. of Germany ........ 360/15

OTHER PUBLICATIONS

Stafford, Jerome W., "Automatic Inspection of Magnetic-Sound Prints", *Electronics*, Mar. 1956.

*Primary Examiner*—Raymond F. Cardillo
*Assistant Examiner*—Alyssa H. Bowler
*Attorney, Agent, or Firm*—Cushman, Darby & Cushman

[57] ABSTRACT

A cassette duplicator machine reads signals from tracks of a master tape and records then simultaneously in tracks of a plurality of slave tapes. To control the fidelity of each recording in the slave tapes, each slave track is monitored by an auxiliary reader head spaced downtrack from the recorder head in the slave, to sample the recorded signal. The sample is then compared with a reference copied from the master tape, which reference is fed to the comparator with a time-delay compensating for the spacing between the slave heads. In one embodiment, the delay is provided by reading the master tracks again at a point spaced downtrack from the conventional master heads. In another embodiment, the master signal is sampled from the output of the conventional master head and successively passed through an averaging circuit and a delay line to the comparator, while the recording sample is also passed through respective averaging and delay circuits before feeding the comparator. The comparator generates an alarm if there is a substantial difference between both samples.

3 Claims, 3 Drawing Figures

FIDELITY CONTROL DURING OPERATION OF DUPLICATOR MACHINES

FIELD OF THE INVENTION

The present invention particularly refers to duplicating cassettes in slave recorder machines, and specifically, to controlling the fidelity of the duplication. The application of the present invention is extensive to the duplication of video, computer, vocal, musical or other types of useful signals. The useful signal may be stored in magnetic tape in a reel, cassette or eight-track magazine, or in other means such as a phonograph record, flopy disc, diskette, optical means, etc.

The invention refers to a monitor apparatus which is added to the duplicator machine and which is operative during the duplication or recording itself, to activate an alarm as soon as a malfunction is detected in the recording. This permits the recorder machine to be stopped either manually or automatically, and so avoid time and money losses, while at the same time the quality of the recording is immediately controlled.

BACKGROUND OF THE INVENTION

In general, the cassette duplicator machines comprise a master or source unit and one of various slaves or recorder units. The master unit is adapted to read at a high speed a master magnetic tape, and send a sample of the read signal to each one of the slaves for recording in the other magnetic tapes.

An example of one of these machines is the Audio/Tek cassette duplicating system, model 1200B having a master unit which may transport a magnetic tape $\frac{1}{4}''$ wide at a speed 32 times faster than the normal speed, and drive up to ten slave units. The master unit reads the signal registered in the portion of the tape which is instantly passing across the reader head, whilst the rest of the tape is deposited in a bin. The movement of the master tape is non-stop and unidirectional, so that tape is continually loaded out of the bin to feed the reader head before being loaded back again to the bin. Each slave unit accepts cassette magnetic tape arranged in bulk in open reel. Typically, each reel may contain 2,400 meters of tape which allows many cassettes to be recorded without interruption, for example, 32 cassettes 24 minutes long on each side.

Other more industrial machines operate similarly, for example MTI Corporation's "System III", uses master tapes either $\frac{1}{2}''$ or $1''$ wide and approximately $0.0015''$ thick. Generally, the normal speed of the master tape is $3\frac{3}{4}$ ips or $7\frac{1}{2}$ ips, i.e. respectively 2 or 4 times faster than the commercial cassette normal universal speed which is $1\frac{7}{8}$ ips. In the cassette duplicator machine, the master tape is transported at a high speed of 240 ips, whilst the slave speed is either 60 ips or 120 ips, according to the type, which is respectively equivalent to 32 or 64 times faster than its normal speed.

There is another type of cassette duplicator machines, not so well known as those mentioned previously, manufactured mainly by RECORTEC, in which the master tape, instead of being endless and deposited in a bin, is transported between two reels, first in one direction and then in the other. That is, a musical programme is recorded in a set of slave tapes, by passing the master tape from one reel to the other; then the set of slave tapes just recorded are replaced by a new set of virgin tapes, and the latter are recorded backwards by returning the master tape to the original reel. Consequently, the programmes are recorded successively, moving the master tape alternatively to and fro.

In all the cases, the duplicating operation is carried out by reading the master tape to reproduce the useful signal which is to be recorded again in the slave tapes. As is well known in the art, a bias signal is added to the useful signal before the latter is sent to the slave recording heads.

Furthermore, in those cases in which the commercial tapes are provided in bulk form for eventually providing tens of cassettes, a cue signal is sent at the end of each programme. Once the entire pancake has been recorded, it is transferred to a fractionating machine which reads the tape to detect the cue signals, in response to which the tape is cut between programmes and then placed in its individual cassette compartment.

It should be fairly evident that is is highly impracticable to carry out a quality control on the recording in each cassette, after the duplication has ended. However, various factors may contribute to cause a deficient recording in terms of fidelity in the commercial tape, for which reason some sort of efficient quality control is deemed necessary. The most usual of these factors worth mentioning are: misalignment of the recorder heads in relation to the commercial tape or twisting of the latter, wear and/or dirt of the recorder head, inadequate bias signal in relation to the composition and quality of the commercial tape, wow and flutter of the transport speed of the commercial tape, low quality composition or dirt of the commercial tape, etc.

DISCLOSURE OF THE INVENTION

Consequently, a main object of the present invention is to provide a fidelity monitor apparatus, to be added to the duplicator or recorder machine, to verify the fidelity of the signal recorded in each slave tape, and to generate an alarm signal which permits immediate interruption of the recording process in case of low fidelity.

The principle of the present invention resides in immediately reading the tape that is being recorded in the machine at the same high recording speed, and comparing the signal thus obtained with the original signal provided by the source after compensating for the time offset between the recording and the reading of the slave tape. The monitor apparatus of the invention includes a pick-up head in each slave unit associated with the duplicator machine adapted to be magnetically coupled with a track of the slave tape, wherein the pick-up head is spaced from the recording head and is located downtrack therefrom, in relation to the transport direction of the slave tape. Furthermore, the signal that has been sent to the recorder tape is sampled to furnish a quality reference signal, and the reference sample is provided with a delay to compensate for the spacing between the recorder and the pick-up heads. A comparator then compares the read slave signal with the sample of the master signal, to generate an alarm signal in case of substantial difference between the amplitudes of both signals. Because the slave pick-up head is in actual fact sampling the signal just recorded in the slave track, the use of the present invention ensures against inadvertently producing misrecordings.

As already mentioned, the duplicating process is carried out at high speed for productivity and efficiency reasons, for which reason it should be noted that the solution of the delay problem is not obvious. For example, the WOLLENSAK 3M duplicator machine model 2770AV provides for each slave to record a C-30 tape cassette in less than a minute, when the normal listening time of each C-30 cassette is half an hour. Normally, the useful signal is in the audio frequency range, whilst the frequency of the bias signal depends on the type of magnetic tape, but it can be placed generally on the order of 30 kHz.

During the high speed recording, these frequencies are translated upwards in the frequency spectrum, thus it must be considered that during duplication, the frequency limits are as high as from 1 to 5 MHz. On the other hand, the delay which must be compensated is on the order of 30 msec, this being a lower limit determined by the mechanical impossibility of reducing the spacing between the heads of the slave unit below a certain limit. Consequently, it is highly impractical to use a delay line for this length of time in the megacycle range, due to the complexity and expense involved in the actual state of the art, concerning both digital and analogue delay lines.

Consequently, a further object of the present invention is to obtain a simple, practical and economical way of enphasing the samples taken from the master (reference) and the slave signals in phase with each other, before comparing them.

In one embodiment of the present invention, this object is obtained by sampling the reference signal directly from the source, specifically from the master tape, by arranging a new pick-up head to read the master tape at a position based downtrack from where the original reader head of the master unit reads the same tape. The distance between the two master unit heads is equivalent to the previously mentioned distance between the two slave heads in the transport speed domain of the respective magnetic tapes.

In another embodiment of the present invention, the reference sample and the slave sample are put in phase with each other by sampling the master signal after it has been read from the source by the original head and then, carrying out a downward frequency conversion, converting the megahertz bandwidth to a lower frequency range. The solution may be considerably simplified if it is realized that an abnormal reduction of any spectral portion of the signal tends to bring about an abnormal reduction in the mean value of said signal in the time domain. This solution is embodied by including respective detectors in both sampling circuits, to average out both signals and effectively produce low frequency samples of the master and slave signals.

PRE-DESCRIPTION OF THE DRAWINGS

FIG. 1 schematically shows a prior art duplicating system for recording stereophonic programmes.

DETAILED DESCRIPTION OF THE DRAWINGS

It is pointed out that each duplicator machine generally operates with one master unit feeding the useful signal to a plurality of slave units, so as to reduce the quantity of play-backs and wear of the master tape. The present patent generally describes one master unit and one slave unit, however, this disclosure is extensive to the usual case of a plurality of slave units. To this effect, it must be understood that the respective signals recorded in each of the slaves tapes are sampled, and then separately compared with the reference sample provided by the master unit. When a malfunction is detected in any one of the slaves, it is highly convenient to just shut down that slave, leaving the rest to continue recording without interruption.

Figure 1:
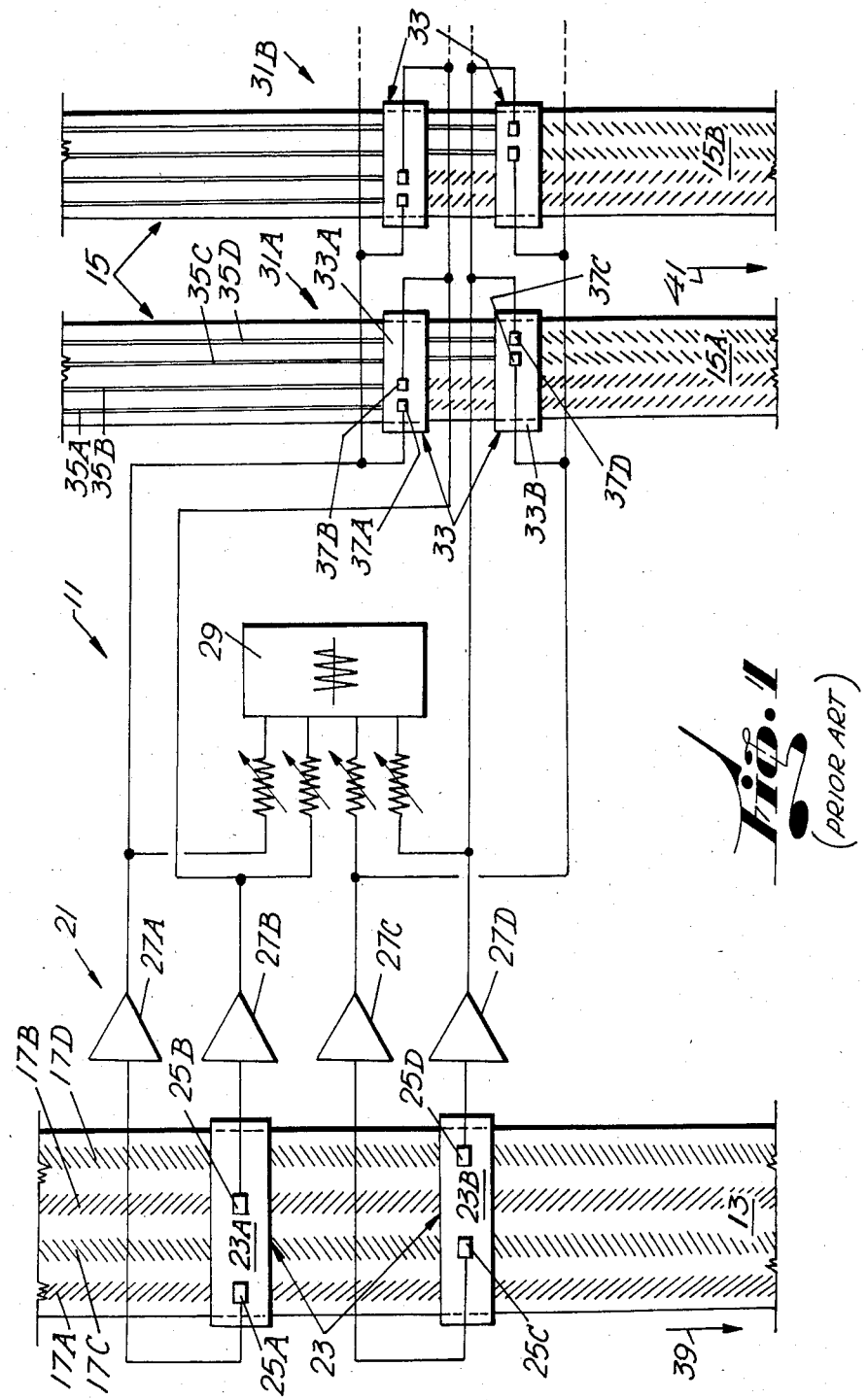

FIG. 1 shows a schematic of a duplicator machine 11 for reading a source 13 by playing back a master magnetic tape ¼" wide and recording it in a set 15 of slave tapes ⅛" wide which are to be destined to respective commercial cassettes, the Figure showing just two slave tapes 15A, 15B for the sake of clarity.

The master tape 13 already contains recordings therein of two stereophonic programmes distributed alternatively in four tracks 17A, 17B, 17C, 17D; wherein the tracks 17A, 17B contain the pair of stereophonic channels of one of these programmes, whilst the tracks 17C, 17D carries therein the pair of channels of the remaining programme recorded in the opposite direction with respect to the programme 17A, 17B. The normal speed, i.e. the speed in which the original recording was effected, of the master tape 13 is 3¾ ips; but during duplication, the master unit 21 of the machine 11 drives tape 13 at a high speed of 120 ips, i.e. 32 times faster.

The master unit 21 further comprises a main reader device 23 in the form of two magnetic pick-up heads 23A, 23B magnetically coupleable to the tape 13. The play-back head 23A features a gap 25A aligned with track 17A, and another gap 25B aligned with track 17B. Similarly, the head 23B has a pair of gaps 25C, 25D respectivelly aligned with the tracks 17C, 17D. Each head 23A, 23B reads one of the programmes loaded in the master tape 13 with the aid of inductive means (not illustrated) associated with the gaps 25A, 25B, 25C, 25D.

Four amplifiers 27A, 27B, 27C, 27D are connected to the respective gaps 25A, 25B, 25C, 25D of the heads 23 to adapt the useful signals forthcoming from the respective tracks 17A, 17B, 17C, 17D. A bias signal generator 29 operating between 2 and 5 MHz, adds the bias signal to the useful signal at the outputs from the amplifiers 27A, 27B, 27C, 27D, before transmitting the bias signal to the slave units 31A, 31B . . .

Making express reference to the slave 31A, and by extension of the slave 31B and others, slave 31A comprises a set 33 of record heads 33A, 33B adapted to magnetically engage the slave tape 15A. The latter has four tracks 35A, 35B, 35C, 35D in similar fashion to the master tape 13, but distributed in a different order. In the commercial tape 15, the tracks 35A, 35B, corresponding to one of the programmes are longitudinally adjacent to each other and occupy half the width of the tape 15, whilst the tracks 35C, 35D of the remaining programme are located adjacent each other on the opposite half-width of the track 15. The virtue of this arrangement is that the crosstalk between programmes is minimized at the price of increasing the crosstalk between the two channels (tracks) of the same programme; however it is preferable that any unavoidable crosstalk be between channels of a same programme than channels of different programmes, because in a stereophonic programme, there is certain similarity between the signals of the two channels, whilst crosstalk between different programmes generates pure noise.

The respective outputs from the amplifiers 27A, 27B, 27C, 27D are connected to the recorder heads 33 to energize the respective gaps 37A, 37B, 37C, 37D of the slave 31A. The gaps 37A, 37B, 37C, 37D of the recorder heads 33 are about 20 μm, and are rather bigger than those of the play-back set 23 which are about 6 μm.

During operation of the machine 11, the master and slave tapes 13, 15 are transported by driver means (not illustrated) across the respective heads 23, 33. The ratio of the speeds of the master and slave tapes 13, 15 is 2:1, the former running at 120 ips in the direction shown by arrow 39 and the slave tapes at 60 ips in the direction given by the arrow 41. The spacing between the heads of a same unit 13, 31A, 31B is not generally critical, because each head operates with a different programme in relation to its pair. The play-back heads 23 read the tracks 17A, 17B, 17C, 17D of the master tape to output the useful signals to be duplicated to the gain stage 27A, 27B, 27C, 27D, where they are amplified to an adequate level. The generator 29 adds the bias signal at the output from the amplifier stage 27A, 27B, 27C, 27D before they are fed to the recorder heads 33 of the slaves.

In actual fact, the useful signals are already recorded with a bias in the master tape 13, but this bias is eliminated in the amplifier stage 27A, 27B, 27C, 27D, because the master and slave tape 13, 15A are of different quality, hence they require different types of bias. The programmes are successively registered and repeated one after the other by the recorder heads 33 in the commercial tapes 15 until these tapes 15 are used up, after which they are replaced by new ones. The cue signals for the fractionating machine are recorded in the blank spaces between each programme on the tape 15.

Figure 2:
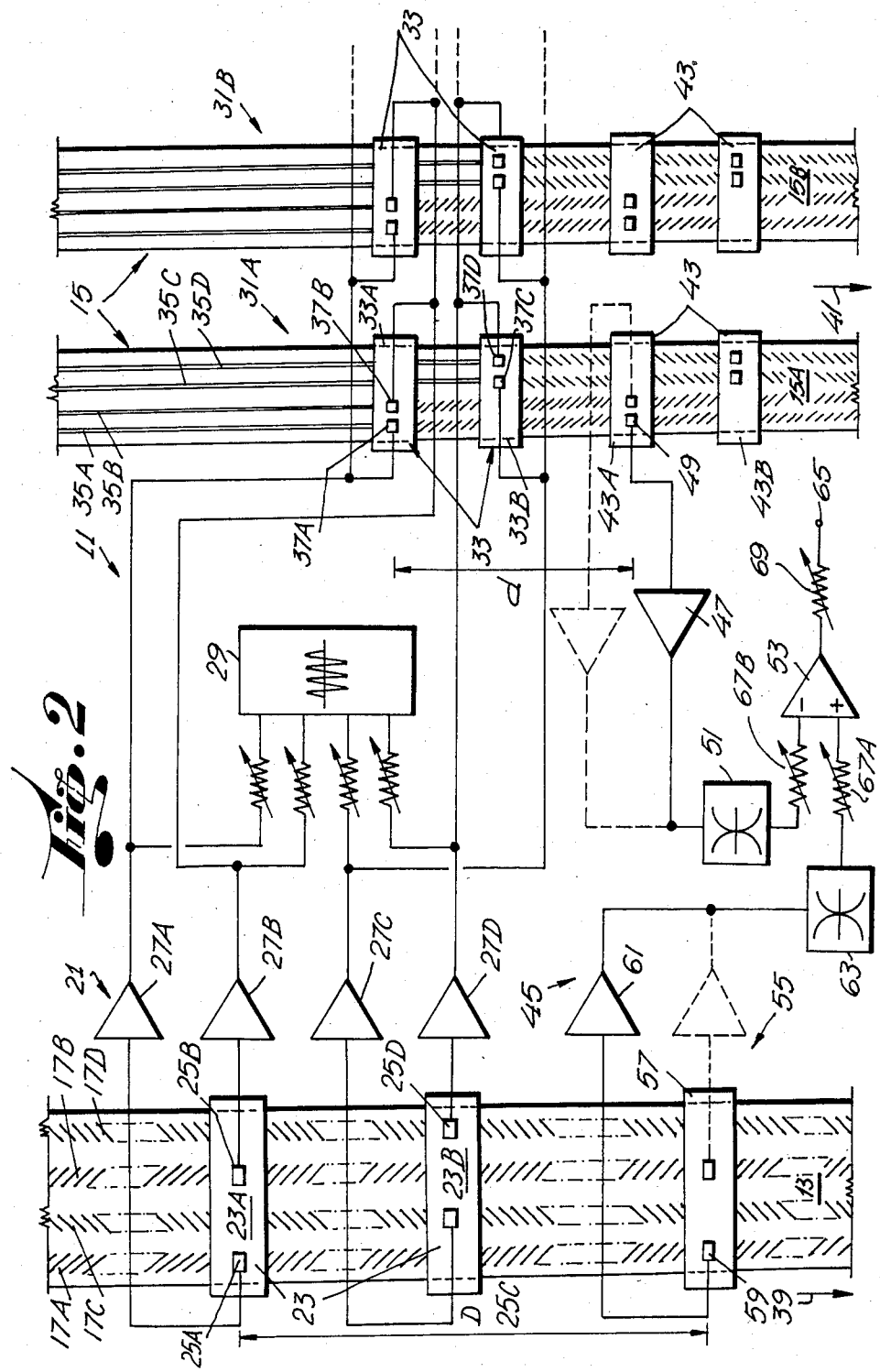
FIG. 2 illustrates a first embodiment of the monitor apparatus of the present invention in the machine of FIG. 1.
Figure 3:
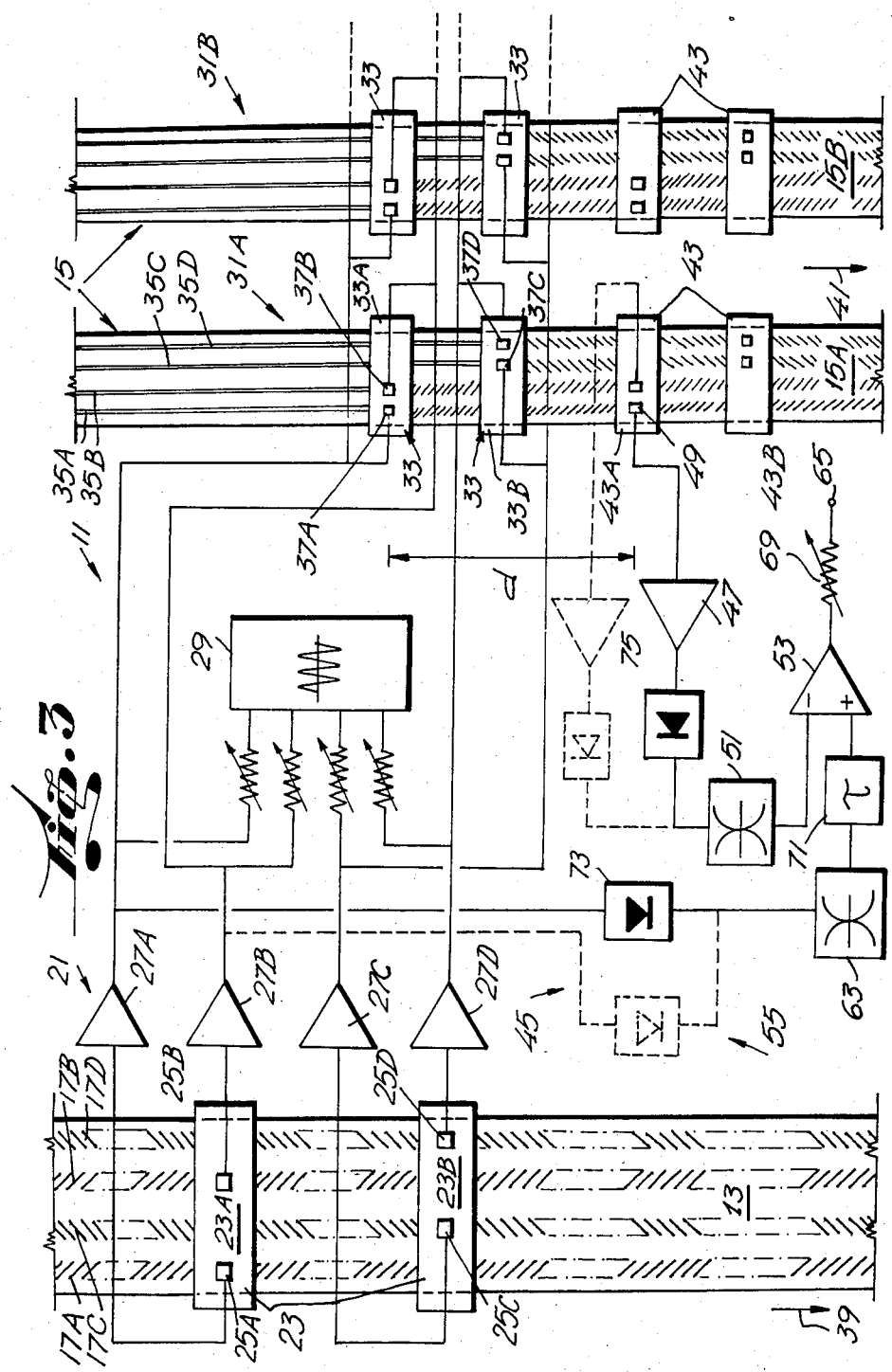
FIG. 3 illustrates a second embodiment of the monitor apparatus of the present invention in the machine of FIG. 1.

In first place, the present invention suggests that the signals just recorded on the tracks 35A, 35B, 35C, 35D be sampled again by a new set 43 of pick-up heads 43A, 43B (such as those sold under the trademark SAKI) located in each slave unit 31A, 31B and positioned in the path of the tape 15 at a point downtrack 41 from the record heads 33 as FIGS. 2 and 3 shown. The recorder and pick-up heads 33A, 43A of the slave 31A are longitudinally separated (along tape 15A) a distance d, such as 2", whilst heads 33B, 43B are likewise spaced an equal distance d.

The invention is applicable to the simultaneous recording of one, two, four, eight or any quantity of tracks 35 in the slave unit 31A. In the case of a single track 35, obviously only one head 43 is needed to sense it. In the case shown in the drawings, referring to four tracks 35A, 35B, 35C, 35D, an option can be taken on monitoring one, some or all the tracks 35, however it is recommended that the four tracks 35A, 35B, 35C, 35D be monitored, for which four independent monitoring circuits may be used. However, considering that the content of the two stereo channels of the same programme is similar, it is possible to combine the two signals sensed from the complementary tracks 35A, 35B as FIGS. 2 and 3 suggest in dashed line. The invention will be described hereinafter, in reference to monitoring one track 35A of the slave tape 15A; however, it may evidently be understood that the description is extensive to the other tracks 35 in multi-channel arrangements such as known in FIG. 1. Insofar as the rest of the slave units 31B . . . of the machine 11, the monitoring portion of the slave 31A is repeated.

The monitor apparatus of the present invention comprises a monitor circuit 45 having an amplifier 47 for receiving the signal sensed at the gap 39 of the monitoring head 43A aligned with track 45A. The signal thus amplified is then shaped in a frequency-response equalizer 51 before being inputted to the inverter input of a comparator 53 embodied by means of a hybrid operational amplifier, such as a JENSEN type 990 or equivalent integrated circuit. The non-inverting input of comparator 53 is fed with the reference sample taken from the master tape 13 by a sampler and delayer circuit 55.

One embodiment, preferred for its precision and flexibility, specially for a uni-directional master unit 21, of the sampling and delaying circuit 55, is illustrated in FIG. 2. The programme 17A, 17B is sampled by an extra pick-up head 57 positioned in the path of the tape 13 at a point downtrack from the main read head 23. It is most important that the longitudinal separation D along the tape 13 between the main sampling heads 23A, 57 be equivalent to the separation d between the slave heads 33A, 43A. This equivalence means that the following condition must be satisfied in order that the respective samples forthcoming from the master and slave units 21, 31A are in phase with each other;

$$D/V = d/v,$$

where V and v are the transport speeds of the master and slave tapes 13, 15A respectively, whilst the inherent signal transit time through the monitor circuit 45 are neglected herein. Because the transport speed ratio is 2:1 as previously mentioned, the distance D is 4" in the present embodiment. Because this distance D is the greater of the two distances D, d, it is allowed to be adjustable for better precision.

The master sampling head 57 has a gap 59 magnetically coupling the track 17A to the inductive means (not illustrated) that generates an electric signal which is passed through an amplifier 61 and a frequency equalizer 63 before entering the non-inverting input of comparator 53. In this manner, both samples are in phase before entering the respective equalizer 51, 63. These equalizers 51, 63, may each be a graphic equalizer sold under the trademark SOUNDCRAFT, and their function is to normalize the frequency spectrum of the two samples before the comparation is carried out, in order to minimize the differences due to different types of magnetic tape 13, 15 which are used for the master and the slave, since the master tape 13 is usually of better quality, which means that it has a greater bandwidth and a better frequency response.

The comparator 53 compares the two normalized samples and switches its output to activate an alarm through a terminal 65 when a difference greater than a predetermined threshold, for example 3 dB, is found between the two sample signals. This threshold depends on the sensitivity of the instrument, and calibration is carried out by acting on potentiometers 67A, 67B, 69 respectively placed in series with the inputs and output of the comparator 53. The 3 dB threshold is recommended because it is frequent to encounter variations of up to 1.5 dB from one end to the other of the tapes, and of 3 dB between tapes of the same type but different batches. Furthermore, the human ear does not generally perceive slow variations of less than 2 dB.

The calibration is carried out by adjusting the equalizers 51, 63 to obtain frequency responses that are both as ample and identical as possible. Then test signals are applied to the monitor circuit 45 and first the potentiometers 67A, 67B are adjusted until the differences between the two signals are eliminated, and finally, the potentiometer 69 is adjusted to obtain the desired sensitivity. The response of the equalizers 51, 63 are verified with the aid of a double-trace osciloscope. It must be borne in mind that the simultaneous modification of both equalizers 51, 63 does not affect the precision of the apparatus, but does affect the sensitivity. Specifically, a reduction in the frequency response lowers the sensitivity, which means that a greater imbalance between the two samples is required to switch the comparator 53.

When the master unit 21 is of the reversible (bidirectional) type (e.g. RECORTEC), the head 57 in the position shown in the FIG. 2 is useful only when the tape 13 is running in the direction 39. A solution to the problem of sampling the master signal when the tape is running back in the opposite direction may consist in placing another sampling head (not illustrated) symmetrically on the other side of the head 23A, thus providing a pair of auxiliary heads (one of which is shown at 57) arranged symmetrically about main head 23A, and activating one or the other according to the transport direction of the tape 13.

The present invention also suggests another solution which is also applicable in those cases in which the master signal is not prerecorded, as happens when an original recording of a programme is being effected with a microphone or a musical instrument. This alternative embodiment of the invention is illustrated in FIG. 3, to which reference is made immediately hereinbelow.

The reference sample is taken from the master tape 13 simultaneously with the main signal which is duly recorded in the slave tapes 15. In this embodiment, the means enphasing the two samples is a delay line 71 connected between the equalizer 63 and the comparator 53. Because a delay line in the megacycle range is extremely expensive at present, a low frequency digital or analogue line is used, for which reason it is imperative that the reference signal sampled by the circuit 55 be converted to a low frequency.

The delay line 71 is adjustable in millisecond steps, to be able to fix a delay $\tau$ equal to d/v, which is on the order of 30 msec. The delay line 71 may be an analogue bucket-brigade, model ECHOCHORD 556, or a digital LEXICON 90, for example.

The sample and delay circuit 55 reads a signal at the output of amplifier 27A, which signal is proportional to the signal registered in the master track 17A, and applies it to an RMS (root means square) amplitude detector 73 which averages it out in time. Consequently, a reference sample indicative of the average of the main signal sent by the amplifier 27A to the slaves 31A, 31B is present at the output of the detector 73. As should be understood by the experts in the art, the average signal is ranged in a lower frequency spectrum, depending on the time constant of the detector 73.

At the same time, it is also necessary to average the sample outputted by the slave head 43A, so it may be comparable with the reference sample. To this end, a similar RMS amplitude detector 75 is inserted between the amplifier 47 and the equalizer 51.

Apart from these differences, the monitoring circuits 45 of the two embodiments shown respectively in FIGS. 2 and 3 function under the same principle, to provide an alarm signal to the terminal 65 when the signal recorded in the slave track 35A is distorted in relation to the signal provided by the master track 17A. Likewise, samples are taken from master tracks 17C, 17D in the same way as from tracks 17A, 17B, to provide references for the comparison of the recording samples provided by head 43B. The signal present at the output terminal 65 may be used to activate a sound and/or luminous alarm signal, and to activate a shutdown servomechanism (not illustrated) to automatically stop the slave 31A when a malfunction is detected.

Although the essential each of the invention have been brought out by means of referred embodiments, the invention is not limited to these embodiments but, on the contrary, extends to all alternative forms within the purview of the appended claims.

I claim:

1. A fidelity monitor apparatus for use with a high-speed recorder machine which has reader means for reproducing a master signal from a master source and producing an output signal indicative thereof, and recorder means including at least one recorder head for recording, at a substantially higher than normal rate, said output signal on each track of a slave means which has at least one moving track, said fidelity monitor apparatus comprising:

slave monitor means including at least one pick-up head spaced a predetermined distance downtrack from each recorder head, for obtaining a slave sample of said master signal just recorded on said moving track by said recorder head;

electronic means connected to said output signal of said reader means for electronically deriving a master reference which is in phase with said slave sample from said output signal, said electronic means including means for producing a master sample from said master signal as soon as said master signal is read at said higher than normal rate from said master source, said produced master sample being in a lower frequency range than that of said master signal;

comparator means for generating a malfunction signal when said slave sample differs from said master reference in more than a predetermined manner; and werein said electronic means further includes delay means, connected between said producing means and said comparator means, for delaying said master sample to enphase said master sample with said slave sample to obtain said master reference, wherein said delay device is selected to operate in said lower frequency range and to provide a time-delay substantially equal to a quotient of said predetermined distance divided by a speed of said moving track relative to slave pick-up and said recorder heads.

2. The fidelity monitor apparatus of claim 1, wherein said producing means comprises a first averaging circuit to produce said master sample as a signal proportional to a mean amplitude of said master signal, and said slave monitor means further includes a second averaging circuit connecting said pick-up head with said comparator means, wherein said slave sample is a signal proportional to the mean amplitude of said recorder master signal and is approximately in a same frequency range as said master sample.

3. A method for monitoring the fidelity of a recording operation in a duplicator machine, comprising the steps of:

first reading master signals from one or more tracks of a master tape using at least one reader head which produces a master signal;

recording, the signals read in said first read step as useful signals in corresponding tracks of one or more slave tapes at a recording position;

second reading the slave tape tracks at nearby positions located a distance downtrack from each recording position; and comparing the useful signal read in said second reading step with a reference signal in order to check the useful signal recorded on each slave tape, wherein the reference signal is generated by a method comprising the steps of:

(a) sampling the master signal produced by the reader head, (b) obtaining a low-frequency representation of the master signal; and (c) providing a time delay for the master signal being substantially equal to the down-track distance divided by a transport speed of the one or more slave tracks, whereby said low-frequency representation is obtained in order for said time-delay to be provided for a signal of relatively low frequency.

* * * * *